United States Patent
Kieffer et al.

(10) Patent No.: US 10,836,871 B2
(45) Date of Patent: Nov. 17, 2020

(54) METHOD OF PREPARATION OF CATIONIC POLYMERS WITH REDUCED HALIDES CONTENT

(71) Applicant: S.P.C.M. SA, Andrezieux-Boutheon (FR)

(72) Inventors: Johann Kieffer, Andrezieux (FR); Cédrick Favero, Andrezieux (FR); Christophe Roux, Andrezieux (FR)

(73) Assignee: S.P.C.M. SA, Andrezieux-Boutheon (FR)

( * ) Notice: Subject to any disclaimer, the term of this patent is extended or adjusted under 35 U.S.C. 154(b) by 54 days.

(21) Appl. No.: 16/331,720

(22) PCT Filed: Sep. 20, 2017

(86) PCT No.: PCT/EP2017/073804
§ 371 (c)(1),
(2) Date: Mar. 8, 2019

(87) PCT Pub. No.: WO2018/054991
PCT Pub. Date: Mar. 29, 2018

(65) Prior Publication Data
US 2019/0202997 A1    Jul. 4, 2019

(30) Foreign Application Priority Data
Sep. 21, 2016 (FR) ................... 16 58855

(51) Int. Cl.
| | | |
|---|---|---|
| C08J 3/07 | (2006.01) | |
| C04B 28/02 | (2006.01) | |
| C04B 28/14 | (2006.01) | |
| C23F 11/173 | (2006.01) | |
| C04B 24/26 | (2006.01) | |
| C08F 126/04 | (2006.01) | |
| C08G 59/50 | (2006.01) | |
| C04B 24/28 | (2006.01) | |
| C08F 26/04 | (2006.01) | |
| C04B 103/00 | (2006.01) | |

(52) U.S. Cl.
CPC ............ *C08J 3/07* (2013.01); *C04B 24/2647* (2013.01); *C04B 24/2682* (2013.01); *C04B 24/281* (2013.01); *C04B 28/02* (2013.01); *C04B 28/14* (2013.01); *C08F 26/04* (2013.01); *C08F 126/04* (2013.01); *C08G 59/50* (2013.01); *C08G 59/5006* (2013.01); *C23F 11/173* (2013.01); *C04B 2103/0053* (2013.01); *C08J 2347/00* (2013.01)

(58) Field of Classification Search
CPC ..... C08J 3/07; C08J 2347/00; C04B 24/2647; C04B 24/2682; C04B 24/281; C04B 28/14; C04B 2103/0053; C08F 26/04; C08F 126/04; C08G 59/50; C08G 59/5006; C23F 11/173
See application file for complete search history.

(56) References Cited

U.S. PATENT DOCUMENTS

| | | | |
|---|---|---|---|
| 3,725,312 A | 4/1973 | Panzer et al. | |
| 3,738,945 A | 6/1973 | Panzer | |
| 4,057,580 A | 11/1977 | Phillips et al. | |
| 6,352,952 B1 | 3/2002 | Jardine et al. | |
| 7,994,265 B2 | 8/2011 | Vicari | |
| 8,304,475 B2 | 11/2012 | Brocas et al. | |
| 8,858,803 B2 | 10/2014 | Guliashvili et al. | |
| 8,906,986 B2 | 12/2014 | Schinabeck et al. | |
| 9,828,500 B2 | 11/2017 | Kuo et al. | |
| 2012/0077928 A1 | 3/2012 | Destarac et al. | |
| 2012/0125863 A1 | 5/2012 | Guliashvili et al. | |
| 2013/0035417 A1 | 2/2013 | Villard et al. | |
| 2015/0065614 A1 | 3/2015 | Kuo et al. | |

FOREIGN PATENT DOCUMENTS

| | | | | |
|---|---|---|---|---|
| WO | WO-2012071223 A1 | * | 5/2012 | ........... C07C 219/08 |
| WO | WO-2012134768 A1 | * | 10/2012 | ............ C04B 16/04 |

OTHER PUBLICATIONS

Preliminary Search Report for FR 1658855, dated Jun. 13, 2017.

* cited by examiner

*Primary Examiner* — Kelechi C Egwim
(74) *Attorney, Agent, or Firm* — B. Aaron Schulman, Esq.; Stites & Harbison, PLLC

(57) ABSTRACT

The present invention relates to a polymer preparation method for preparing water-soluble cationic polymers P1 wherein the halides content is reduced, as well as to the use of these polymers as additives in compositions that are based on inorganic mineral binders or in the treatment of aqueous open, semi-closed, or closed circuits.

16 Claims, No Drawings

METHOD OF PREPARATION OF CATIONIC POLYMERS WITH REDUCED HALIDES CONTENT

The object of the present invention relates to a polymer preparation method for preparing water-soluble cationic polymers having a high cationic charge density with reduced halides content.

The object of the present invention also relates to the use of the above-mentioned water-soluble cationic polymers as additives in compositions based on inorganic mineral binders or on gypsum derivatives, or in the treatment of open, semi-closed, or closed aqueous circuits.

Water-soluble cationic polymers having a high charge density and low viscosity are known from the skilled person and may be obtained by various methods.

Mention may be made for example of the reaction of polycondensation of di-functional amine compounds, such as alkylene amines, or primary or secondary monoamines with a di-functional compound selected from among diepoxides, epihalohydrins or di-halogen compounds.

In order to satisfy the criterion of high cationic charge density, it is known practice from U.S. Pat. Nos. 3,738,945 and 3,725,312 to preferably use monomer entities having a molecular weight that is as small as possible; ammonia or mono- or di-alkylated amines being the preferred entities.

However, the use of ammonia or mono-alkylated amines generates structured polymers (branched), wherein although their viscosity is lower than 200 cps, the cationic charges are sterically very slightly not accessible, thereby making these branched structures least preferred.

Thus, in order to obtain linear polymers of low molecular weight, the person skilled in the art would preferably use di-alkylated amines, among which dimethylamine is the preferred one.

For the polycondensation reaction, epihalohydrins, and preferably epichlorohydrin, are generally preferred over di-epoxides, because they have lower molecular weight and thus make possible the preparation of cationic polymers having high cationic charge density. However, the cationic polymers thus obtained are characterized by high halides content.

The use of dihalogenated compounds such as dichloroethane is also known from the document U.S. Pat. No. 4,057,580 for the preparation of polymers characterized by a very high cationic halides content.

The radical polymerization reaction of at least one ethylenic monomer having a quaternary ammonium functional group that may be selected from among acrylamidopropyl trimethyl ammonium chloride (APTAC), methacrylamido propyl trimethyl ammonium chloride (MAPTAC), dimethylaminoethyl acrylate (DMAEA) or dimethylaminoethyl methacrylate (DMAEMA), all of these compounds being quaternised by halogenated alkyl derivatives or dialkyl sulfates, is also known to the person skilled in the art.

Another method of preparation of water-soluble cationic polymers having high cationic charge density and low viscosity known to the person skilled in the art is the reaction of radical polymerization of at least one allyl monomer such as a diallyl dialkyl ammonium halide. Among the allyl monomers, diallyl dimethyl ammonium halides make it possible to obtain the highest charge density polymers, the allyl monomer that is the most accessible in the market being diallyl dimethyl ammonium chloride (DADMAC). The polymers containing DADMAC are characterized by a high chlorides content. In particular, DADMAC homopolymers are characterized by chlorides contents greater than 10% by weight of the polymer, typically greater than 20%.

All of these water-soluble cationic polymers having a high charge density are commonly used as additives in compositions based on inorganic binders (calcium sulphates in their more or less hydrated form such as cement, plaster, gypsum or anhydrite) or as coagulants in closed or semi-closed circuits (for example paper manufacturing, mining sector methods and processes).

More precisely, in the field of construction, the compositions containing cement, aggregates, lime, plaster, slag such as concrete, mortar, coatings, and therefore based on inorganic mineral binders, also known as hydraulic and air (non-hydraulic) binders, often contain clays, just like drilling muds used for the cementing of wells with a view to the extraction of oil and gas. However, these clays have a lamellar structure that can absorb water or certain additives thereby inducing poor performance of construction/drilling materials (cracks due to swelling of clays, problems of flow, of gelation, etc).

It is then known practice to use water-soluble cationic polymers having high cationic charge density as a moderation agent for moderating the effect of clays (also referred to as inerting agent or inertant for clays). Thus, the documents U.S. Pat. No. 6,352,952, US 2013/0035417 and EP 2 414 460 disclose the use of cationic polymers in order to moderate the effect of clays in cementitious compositions.

When the clays are non-swelling clays, they can have a deleterious effect on the performance of building materials. A practice also known from the document US 2013/0035417 is the use of cationic polymers as a moderating agent for moderating the effect of these non-swelling clays.

In addition, it is known that the presence of clays in compositions based on hydraulic binders—and more particularly for building materials that are derived from gypsum (calcium sulphate in anhydrous form, hemi-hydrate or di-hydrate form)—can induce a degradation of performance of these materials. In order to remedy this, it is a known practice from the document U.S. Pat. No. 8,906,986 to use quaternary amines as a moderating agent for moderating clay in order to maintain the performance levels of the super-plasticizer contained in the formulation.

Finally, the use of functionalized cationic polymers resulting from the polycondensation between an epihalohydrin and a dialkylamine in order to moderate the effect of clays on the aggregates is known from the document US 2015/0065614.

However, all of the water-soluble cationic polymers described in the state of the art for such uses are characterized by high halides content, which is problematic. Indeed, the presence of halides and in particular the presence of chlorides, in the compositions results in the corrosion of metallic materials, such as metal frameworks and fittings, with which they are in contact (Corrosion of Steel in Concrete: Prevention, Diagnosis, Repair, 2nd Edition, Luca Bertolini).

In addition, when these water-soluble cationic polymers are used in closed or semi-closed circuit systems, it is possible to be faced with an accumulation of halides within the circuit, thus generating problems related to conductivity and/or precipitation of the salts present in the circuit.

Therefore there exists at the current time, a need to prepare water-soluble cationic polymers having a high cationic charge density, a low viscosity and a reduced halides content and that make it possible to reduce, or even to eliminate the phenomenon of corrosion and/or precipitation encountered during the use thereof.

One objective of the present invention is therefore to provide a polymer preparation method for preparing cationic polymers having high cationic charge density, low viscosity and that have a reduced halides content.

Another objective of the present invention is to ensure the availability of these water-soluble cationic polymers in order to reduce or even to eliminate the phenomenon of corrosion and/or precipitation encountered during the use thereof.

Thus, the present invention relates to a polymer preparation method for preparing an aqueous solution of water-soluble cationic polymers P1 characterized by a halides content lower than 10% by weight of the polymer, a viscosity at 25° C. lower than 200 cps, this viscosity being determined for an aqueous solution of polymers P1 concentrated at 50% by weight, and a cationic charge density greater than or equal to 4 meq·g$^{-1}$, said method including the following steps:

a) adding, at a temperature comprised between 0° C. and 120° C., of at least one compound of formula (I) to an aqueous solution of at least one water soluble cationic polymer P2 wherein the halides content is greater than 10% by weight of the polymer, the viscosity at 25° C. is lower than 200 cps, this viscosity being determined for an aqueous solution of polymers P2 concentrated at 50% by weight, and the cationic charge density being greater than or equal to 4 meq·g$^{-1}$, the compound of formula (I) being defined by the formula: $R^1$—COO—$Y_1^+$, wherein:

$R^1$ represents a hydrogen atom or a saturated alkyl chain, either linear or branched, comprising from 1 to 8 carbon atoms, that may contain at least one nitrogen atom and/or oxygen atom, said chain may be substituted by 1 to 4 carboxylate functional groups of formula —COR;

$Y_1^+$ represents an alkali metal cation, an ammonium of formula $R^2$—$NH_3^+$, or a quaternary ammonium of formula $R^3$—$N^+(R^4)(R^5)(R^6)$;

R represents a OH group or a group $O^-Y_2^+$;

$Y_2^+$ represents an alkali metal cation or an ammonium of formula $R^2$—$NH_3^+$;

$R^2$ represents a hydrogen atom or a saturated alkyl chain, either linear or branched, comprising from 1 to 4 carbon atoms; and $R^3$, $R^4$, $R^5$ and $R^6$ represent, independently of each other, a saturated alkyl chain, either linear or branched, comprising from 1 to 4 carbon atoms;

in order to obtain a mixture;

b) agitation of the mixture obtained in step a) for at least 5 minutes in order to obtain a stirred mixture;

c) decreasing of the temperature of the stirred mixture obtained at the end of step b) at a temperature comprised between −10° C. and 50° C. in order to obtain a cooled mixture; and d) liquid/solid separation of the cooled mixture obtained at the end of step c) in order to obtain an aqueous solution of cationic polymers P1.

According to the invention, a polymer is referred to as "cationic" when it bears at least one cationic group. By way of a cationic group, mention may be made for example of the ammonium or phosphonium groups.

According to the invention, a polymer is referred to as "water-soluble" when, concentrated to 50 g·L$^{-1}$, it allows obtaining an aqueous solution that does not contain any insoluble particle after dissolution as a result of agitation.

According to the invention, the "halides content" is defined as being the ratio of the total molar masses of the halides over the molar mass of the cationic polymer.

For example, the halides content may be measured by means of ion chromatography or elemental analysis.

Preferably according to the invention the halides content is a content of chlorides.

For example according to the invention the content of chlorides of the water-soluble cationic polymers P1 or P2 is quantified by ion chromatography. The apparatus used is a Metrohm Ion Chromatography 850 Professional IC equipped with an 896 Conductivity detector and a Metrosep A Supp5 250/4.0 column. The conditions of analysis consist of a flow rate of 0.7 mL/min, a time period of analysis of 35 min, a column temperature of 35° C., an injection volume of 25 μL and a mobile phase constituted of an aqueous solution of 3.2 mM of sodium carbonate and 1 mM of sodium bicarbonate. The internal standard is sodium bicarbonate.

According to the invention, the "viscosity" is the dynamic viscosity measured at 25° C. and for a shear of 7.34 s$^{-1}$.

According to the invention, the viscosity of the water-soluble cationic polymers P1 or P2 can be determined for an aqueous solution containing 50% by weight of the polymers P1 or P2 by means of an apparatus of such type as Kinexus Pro2 from Malvern©. The apparatus is equipped with a 2° cone-plate module. 2.3 mL of the solution of polymers P1 or P2 are disposed in the measuring cell controlled at 25° C. and whereof the shear is 7.34 s$^{-1}$. The viscosity is the average of 10 viscosity measurements performed every 20 seconds.

According to the invention, the cationic charge density of a polymer is defined as being the ratio of the total number of positive charges of the said polymer over its molecular weight.

According to the invention, the cationic charge density of the water-soluble cationic polymers may be determined by means of a colorimetric assay with potassium polyvinyl sulfate (KPVS) in the presence of a colored indicator (toluidine blue) according to the following protocol:

A cationic polymer solution is prepared at a concentration of 5 g·L$^{-1}$ in deionized water (stock solution). 1 g of this stock solution is sampled and then diluted in 100 mL of deionized water (Solution 1). Hydrochloric acid 0.1 N is added to Solution 1 in order to adjust the pH to 4. Subsequently, three drops of an aqueous solution of toluidine blue at 0.1% concentration are added. Solution 2 is thus obtained.

In parallel, a graduated burette of a solution of KPVS at N/400 (with known correction factor f) is prepared, and then added drop by drop to Solution 2. The dosage is concluded when Solution 2 turns color from blue to violet, and the violet color persists for a few seconds. The volume in milliliters of KPVS solution is denoted by V.

The cationic charge density of the polymer is then determined by the following formula $$E = \frac{V \times 10^{-3}}{5 \times 10^{-3}} \times \frac{1}{400} \times f \, (\text{eq/g})$$

$$E = \frac{V}{2} \times f \, (\text{meq/g})$$

The cationic charge density is expressed in meq·g$^{-1}$.

According to the invention, the "liquid/solid separation" is a step that consists of separating the insoluble compounds of the solution of polymers P1.

According to the invention, the "insoluble compounds" are compounds that are not soluble in water and result from the method of the invention.

For example, the content of insoluble compounds contained in the solution of water-soluble cationic polymers P1 is determined by filtration of the solution of polymers P1 on a filter whose porosity is lower than or equal to 6 µm. Following this filtration, the filter having collected the insoluble particles is putted in an oven at 500° C. for 2 hours. The percentage of insoluble compounds contained in the solution of polymer P1 is defined as being the ratio of the mass of particles collected on the filter after drying, by the mass of the polymer P1 solution before filtration.

Preferably, the polymers P1 of the invention are water-soluble cationic polymers characterized by a chlorides content lower than 10% by weight of the polymer, a viscosity at 25° C. lower than 200 cps, said viscosity being determined for an aqueous solution of polymers P1 concentrated at 50% by weight, and a cationic charge density greater than or equal to 4 meq·g$^{-1}$.

Preferably, the polymers P1 of the invention are water-soluble cationic polymers characterized by a chlorides content lower than 10% by weight of the polymer, a viscosity at 25° C. lower than 200 cps, said viscosity being determined for an aqueous solution of polymers P1 concentrated at 50% by weight, a cationic charge density greater than or equal to 4 meq·g$^{-1}$ and a mass content of insoluble compounds lower than 2% relative to the total weight of the polymer.

Preferably, the polymers P1 of the invention are water-soluble cationic polymers characterized by a chlorides content lower than 10% by weight of the polymer, a viscosity at 25° C. lower than 200 cps, said viscosity being determined for an aqueous solution of polymers P1 concentrated at 50% by weight and a cationic charge density greater than or equal to 5 meq·g$^{-1}$. Preferably, the polymers P1 of the invention are water-soluble cationic polymers characterized by a chlorides content lower than 10% by weight of the polymer, a viscosity at 25° C. lower than 200 cps, said viscosity being determined for an aqueous solution of polymers P1 concentrated at 50% by weight, a cationic charge density greater than or equal to 5 meq·g$^{-1}$ and a content by weight of insoluble compounds lower than 2% relative to the total weight of the polymer.

According to one preferred embodiment, the polymers P1 of the invention are water-soluble cationic polymers characterized by a cationic charge density greater than or equal to 6 meq·g$^{-1}$.

The viscosity at 25° C. of the polymers P1 obtained according to the method of the invention is lower than 200 cps, said viscosity being determined for an aqueous solution of polymers P1 concentrated at 50% by weight. Preferably, the viscosity at 25° C. of the polymers P1 is lower than 150 cps, preferably lower than 100 cps, said viscosity being determined for an aqueous solution of polymers P1 concentrated at 50% by weight for a concentration of 50% active water soluble polymer in the solution.

The polymers P2 used in the method of the invention are water-soluble cationic polymers characterized by a chlorides content greater than 10% by weight of the polymer, a viscosity at 25° C. lower than 200 cps, said viscosity being determined for an aqueous solution of polymers P2 concentrated to 50% by weight, and a cationic charge density that is greater than or equal to 4 meq·g$^{-1}$.

Preferably, the aqueous solution of at least one water soluble cationic polymer P2 used in step a) of the method of the invention is concentrated at most to 80% by weight relative to the total weight of the solution. The viscosity at 25° C. of an aqueous solution of at least one hydrosoluble cationic polymer P2 concentrated to 80% by weight may be greater than 2 000 cps.

The cationic charge density of the polymers P2 used in step a) of the method of the invention is greater than or equal to 4 meq·g$^{-1}$. Preferably, the cationic charge density of the polymers P2 is greater than or equal to 6 meq·g$^{-1}$.

The viscosity at 25° C. of the polymers P2 used in step a) of the method of the invention is lower than 200 cps. Preferably, the viscosity at 25° C. of the polymers P2 is lower than 100 cps, and even more preferably lower than 50 cps, said viscosity being determined for an aqueous solution of polymers P2 concentrated to 50% by weight.

In a preferred manner according to the invention, during step a), the ratio of the number of anionic charges of the compound of formula (I) to the number of cationic charges of the water-soluble cationic polymer P2 is comprised between 0.2:1 and 5:1, preferably between 0.6:1 and 2:1.

The number of anionic charges of the compound of formula (I) is defined as being the sum of the number of functional groups —COO$^-$Y$_1^+$ and —COO$^-$Y$_2^+$.

In an advantageous manner according to the invention, the temperature during step a) is comprised between 0° C. and 120° C., preferably between 10° C. and 95° C., and even more preferably between 15° C. and 80° C.

In a preferential manner according to the invention, the compound of formula (I) used in step a) is such that R$^1$ represents a hydrogen atom or a methyl group.

Preferably, in the formula (I) mentioned above, Y$_1^+$ is selected from among alkali metal cations, and in particular from sodium, potassium or lithium.

Preferably, in the formula (I) mentioned above, Y$_1^+$ is NH$_4^+$.

In an advantageous manner according to the invention, the compound of formula (I) is selected from among sodium formate, potassium formate, sodium acetate and potassium acetate. Preferably, the compound of formula (I) is selected from potassium formate and potassium acetate.

Also in an advantageous manner according to the invention, the water-soluble cationic polymers P2 used in step a) of the method of the invention are selected from among the products of the radical polymerization of at least one ethylenic monomer having a quaternary ammonium function, such as acrylamido propyl trimethyl ammonium chloride (APTAC), methacrylamido propyl trimethyl ammonium chloride (MAPTAC), dimethylaminoethyl acrylate (DMAEA) or dimethylaminoethyl methacrylate (DMAEMA) quaternised with halogenated alkyl derivatives.

In a preferential manner according to the invention, the water-soluble cationic polymers P2 used in step a) of the method of the invention may be selected from among products of the radical polymerization of allyl monomers such as diallyldialkyl ammonium halides.

In a preferential manner according to the invention, the polymer P2 obtained by way of the radical polymerization used in step a) of the method is derived from the polymerization of at least one monomer of such type as diallyldialkyl ammonium halide. Preferentially, the polymer P2 used in step a) is obtained by way of the radical polymerization of diallyl dimethyl ammonium chloride (DADMAC).

In an advantageous manner, the water-soluble cationic polymer P2 employed in step a) of the method according to the invention may be obtained by way of the radical copolymerization with at least one nonionic monomer selected from among (meth)acrylamide, N,N-dialkyl (meth)acrylamide, the hydroxy alkyl esters of (meth)acrylic acid, N-vinyl pyrrolidone, N-vinyl formamide, the methacrylates of polyethylene glycol or of propylene glycol, isoprenyls of polyethylene glycol or of propylene glycol, ethers of polyethylene glycol and vinyloxybutyl, allyl ethers of polyethylene glycol or propylene glycol. In a preferential manner according to the invention, the water soluble polymer P2 used in step a) of the method according to the invention may be obtained by way of the radical polymerization of at least one nonionic monomer such as acrylamide.

In an advantageous manner, the water-soluble cationic polymer P2 may be obtained by way of radical copolymerization with at least one anionic monomer selected from among the monomers comprising at least one carboxylic function, such as (meth)acrylic acids, itaconic acids, fumaric acids, maleic acids and the salts thereof, the monomers comprising a sulfonic acid function, for example, 2-acrylamido-2-methylpropane sulfonic acid (AMPS), vinylsulfonic acid, allylsulfonic acid, styrenesulfonic acid and the salts thereof. Preferably according to the invention, the water soluble polymer P2 used in step a) of the method according to the invention may be obtained by way of the radical polymerization of at least one anionic monomer selected from among acrylic acid and 2-acrylamido-2-methylproprane sulfonic acid and the salts thereof.

The radical polymerization enabling obtaining the water-soluble cationic polymers P2 may be initiated by various techniques known to the person skilled in the art. A first technique is the use of initiating agents such as peroxides, persulfates, azo derivatives or oxidizing/reducing couples. Other techniques may be used, such as photo-initiation, controlled radical polymerization, atom-transfer radical-polymerization (ATRP), radical polymerization in the presence of nitroxides (NMP) or controlled radical polymerization by reversible addition-fragmentation chain transfer (RAFT).

The international patent application WO 2008/000766 describes the control agents used for the RAFT type controlled radical polymerization. In a preferential manner according to the invention, when this type of polymerization is selected, the control agents for the RAFT polymerization may be selected from among xanthates, dithioesters, trithiocarbonates, dithiocarbamates, dithiocarbazates, and dithiophosphoroesters.

In an advantageous manner according to the invention, the preferred control agent used in order to prepare the water-soluble cationic polymers P2 by means of RAFT type polymerization is O-ethyl-S-(1-methoxycarbonyl-ethyl) xanthate.

In an advantageous manner according to the invention, the water soluble cationic polymer P2 which is operationally applied in step a) is a product of polycondensation of at least one epihalohydrin and at least one secondary amine, preferably it is the product of polycondensation of epichlorohydrin and dimethylamine.

Preferably, when this reaction is used to prepare P2, the stoichiometric ratio between dimethylamine and epichlorohydrin is comprised between 1:0.99 and 1:0.80, preferably between 1:0.95 and 1:0.85. This ratio is also described in the U.S. Pat. No. 4,569,991.

In a preferential manner according to the invention, during step b) of the method of the invention, the mixture obtained at the conclusion of step a) is left under agitation for a period of at least 5 minutes, preferably between 5 minutes and 360 minutes, and more advantageously between 30 minutes and 360 minutes.

In a preferential manner according to the invention, during step b) of the method of the invention, the mixture obtained at the conclusion of step a) is agitated by mechanical or magnetic means.

In a preferential manner according to the invention, during step c) of the method of the invention, the temperature of the agitated mixture resulting upon conclusion of step b) is advantageously lowered to between −10° C. and 50° C. and preferably between 0° C. and 40° C.

Preferably, step d) of liquid/solid separation of the method of the invention is a decantation or filtration process. Preferably, when this liquid/solid separation is performed by filtration, it is so done by means of centrifuges, belt filtres, press filtres or plate filtres.

Preferably according to the invention, the liquid/solid separation of step d) makes it possible to obtain an aqueous solution of water-soluble cationic polymer P1 comprising less than 2% by weight, more preferably less than 1% by weight of insoluble compounds.

The quantity of insoluble compounds is directly related to the quantity of halides contained in the aqueous solution of polymer P1. Thus, the lower the content of insoluble compounds, the lower the content of halides will be in this polymer.

In an advantageous manner, the method according to the invention may include a step e), subsequent to step d) of the method of the invention. Preferably, the method according to the invention includes a step e) of drying of the aqueous solution of water-soluble cationic polymers P1 obtained at the end of step d).

Preferably, upon the conclusion of step e), the water-soluble cationic polymers P1 are in solid form. Any appropriate method of drying known from the person skilled in the art may be used for carrying out step e) of the method of the invention. Preferably, the drying method is selected from the following drying methods: by means of spray drying, over a drum dryer or by electromagnetic waves such as microwaves, infra-red waves or high frequency waves.

Once dried, the insoluble cationic polymers P1 in solid form obtained at the conclusion of step e) of the method according to the invention may be dissolved in an aqueous solution to the desired concentration for subsequent use thereof. The water-soluble cationic polymers P1 may also be in powder form. When used in powder form, the polymers P1 may either get dissolved partially or totally, or remain in solid form during use thereof.

The present invention also relates to the use of water-soluble cationic polymers P1 that are likely to be obtained by the method according to the invention and in respect whereof the halides content is lower than 10% by weight of the polymer, the viscosity at 25° C. is lower than 200 cps, this viscosity being determined for an aqueous solution of polymers P1 concentrated at 50% by weight, the charge density is greater than or equal to 4 meq·g$^{-1}$ and the mass content of insoluble compounds is lower than 2% by weight.

According to one preferred embodiment, the invention also relates to the use of water-soluble cationic polymers P1 that are likely to be obtained by the method according to the invention and whereof the charge density is greater than or equal 6 meq·g$^{-1}$.

In a preferential manner according to the invention, the water-soluble cationic polymers P1 obtained by the method of the invention are used as additives in compositions that are based on inorganic mineral binders or on gypsum derivatives.

In particular, the present invention relates to the use of polymers P1 as defined here above, having a charge density that is greater than or equal to 6 meq·g$^{-1}$, as a moderating agent for moderating the effect of clays in a composition based on inorganic mineral binders or on gypsum derivatives.

According to the invention, a composition based on mineral binders is defined as being a composition comprising of at least one inorganic mineral binder such as calcium sulfate that may be in a more or less hydrated form (cement, plaster, gypsum or anhydrite). According to the invention, such a composition may be used in the field of construction. According to the invention, such a composition may also comprise at least one clay.

According to the invention, a gypsum derivative is defined as being calcium sulphate in anhydrous form, hemi-hydrate or di-hydrate form. Thus, according to the invention, a composition based on gypsum derivatives is defined as being a composition used in the field of construction and comprising calcium sulphate in anhydrous form, hemi-hydrate or di-hydrate form. Also in a preferential manner, the water-soluble cationic polymers P1 obtained by the method of the invention are used for the treatment of open, semi-closed or closed aqueous circuits. Preferably, the water-soluble cationic polymers P1 obtained by the method of the invention are used for the treatment of closed or semi-closed circuits and systems.

According to the invention, the water-soluble cationic polymers P1 obtained according to the method of the invention may be used in the field of construction, as an additive in aggregates (sand, gravel, stones and pebbles, cements), concretes or mortars (coatings, plasters).

According to the invention, a closed or semi-closed circuit is any circuit that may contain metal elements (conduits) and such that at least one part of the outflowing stream is recycled into the inflowing stream. By way of a closed or semi-closed circuit, mention may be made of facilities for treatment of rain/storm waters, domestic/household or industrial waste waters, facilities involved in paper manufacturing or mining related processes, drilling rigs and installations and metal processing facilities.

According to the invention, an open circuit is any circuit that may contain metal elements and such that the outflowing stream is not recycled into the inflowing stream. By way of open circuits, mention may be made of facilities related to processes used in the sectors of construction, electronics and wood treatment (autoclaving).

The water-soluble cationic polymers P1 obtained by the method of the invention are characterized by a reduced halides content. Thus, an advantage with regard to their use in the aqueous open, closed or semi-closed circuits is their reduced corrosiveness with respect to metals, in particular with respect to steels surrounded by the formulation containing polymers such as reinforced concrete irons. An additional advantage to the use of water-soluble cationic polymers P1 obtained by the method of the invention to their use in the closed or semi-closed circuits is the reduced accumulation of halides in these circuits, due to the reduced content of halides in these polymers.

In an advantageous manner according to the invention, when the polymers resulting from the method of the invention are used as additive in a composition based on inorganic mineral binders or on gypsum derivatives, they preferably have a role as moderating agent for moderating the effect of clays.

According to the invention the term "moderating agent for moderating the effect of clays" is understood to indicate that the agent employed serves the purpose of reducing the deleterious effect of clays on construction materials.

Thus, the invention also relates to the use of water-soluble cationic polymers P1 that are likely to be obtained according to the method of the invention, whereof the halides content is lower than 10% by weight of the polymer, the viscosity at 25° C. is lower than 200 cps, this viscosity being determined for an aqueous solution of polymers P1 concentrated at 50% by weight, and the charge density is greater than or equal to 4 meq·g$^{-1}$, as moderating agent for moderating the effect of clays in a composition based on inorganic mineral binders or on gypsum derivatives. Preferably, the invention relates to the use of water-soluble cationic polymers P1 as moderating agent for moderating the effect of clays in a cementitious composition.

In a preferential manner according to the invention, the water-soluble cationic polymers P1 that are likely to be obtained according to the method of the invention are particularly effective as moderating agent for moderating the effect of clays in compositions comprising the following clays:

the swelling clays of type 2:1 such as smectite, or type 1:1 such as kaolin or type 2:1:1 such as chlorite;
silicate of magnesium and/or aluminum;
phyllo silicates having a lamellar structure;
amorphous clays.

Without being limited to a specific list, the present invention also relates to clays that are generally present in sand, such as montmorillonite, illite, kaolinite, or even muscovite.

The clays can, among other behaviors, absorb water and induce poor performance of building materials. When the cationic and water-soluble polymers P1 that are likely to be obtained by the method of the invention are used as moderating agent for moderating the effect of clay, among other characteristics and behaviors demonstrated, they make it possible to prevent the swelling of clays that could thus then induce cracks thereby weakening any construction. These polymers P1 also make it possible to prevent rheological problems in the formulations that could originate from the adsorption of super-plasticizing agents and/or water by the clays.

In a preferential manner according to the invention, water-soluble cationic polymers P1 that are likely to be obtained by the method of the invention are used in compositions comprising clays and act as moderating agent for moderating the effect of these clays. The concentration of polymers P1 in such compositions is comprised between 0.1% and 100% by weight in relation to the dry weight of clays contained in the hydraulic composition to be treated. Preferably, the concentration of polymers P1 is comprised between 0.5% and 50%, and more advantageously between 1% and 30%.

Optionally, the cementitious compositions based on inorganic mineral binders or on gypsum derivatives, within which are added the polymers P1 that are likely to be obtained according to the method of the invention, include other additives selected from among agents that limit the contribution of water (lignosulfonate, naphthalene sulfonate formaldehyde adducts, melamine sulfonate formaldehyde adducts), super-plasticising agents (comb polymers with units of polycarboxylate containing ethylene oxide and/or propylene oxide groups), gluconate, set retarding agents, set accelerating agents, antifoaming agents, surface-active agents or surfactants, or heavy metal chelating agents.

In a preferential manner according to the invention, when the water-soluble cationic polymers P1 that are likely to be obtained by the method of the invention are used in the field of construction, they are applied directly by spraying of a solution of polymers P1 on the aggregates, present on the washer belt or on the mixer. Alternatively according to the invention, when the polymer obtained from the method of the invention is used as an additive for a composition based on inorganic binders, it is added directly to the composition within a central concrete mixing facility, a concrete mixing plant or in a plant for prefabrication of materials, or is supplied by the inorganic binder used to prepare the composition.

The invention also relates to the use of water-soluble and cationic polymers P1 that are likely to be obtained by the method of the invention as a coagulating agent for coagulation of elastomers.

The effectiveness of the method of the invention and of the use of polymers derived from the said method are illustrated in the light of the examples which follow, but are not limited thereto.

EXAMPLES

Example 1 Preparation of a Polymer P1 Characterized by a Chlorides Content Lower than 10% by Weight of the Polymer and Obtained as a Result of the Polycondensation of Epichlorohydrin and Dimethylamine In a 1 litre reactor equipped with a jacket, a condenser, a mechanical agitation mechanism and a temperature sensor probe, the following were added: 272 g of dimethylamine at a concentration of 60% by weight (source: Sigma Aldrich) and 331 g of water. Thereafter, 319 g of epichlorohydrin (source: Sigma Aldrich) was added drop-by-drop over a period of 3 hours, with the temperature being maintained at 70° C.-80° C.

Approximately 80 g of water at 50° C. was then added to the mixture in order to adjust the concentration of the polymer so formed to 50% by weight.

The polycondensation product obtained—known as polymer A—is characterized by a cationic charge density equal to 7 meq·g$^{-1}$, a viscosity at 25° C. of 30 cps, this viscosity being determined for an aqueous solution of polymer A concentrated to 50% by weight, and a chlorides content of 25% by weight of the polymer; these values being measured according to the protocols as previously defined.

500 g of the polymer A were introduced into a thermostatically controlled 1-litre reactor equipped with a jacket, a magnetic agitator, a condenser, and a temperature sensor probe prior to 183 g of potassium acetate (source: Sigma Aldrich) being introduced therein. The reaction mixture was heated to 80° C., and maintained under agitation for a period of 2 hours, then cooled to 25° C. and filtered with a centrifugal extractor RC30 (supplier: Robatel) equipped with a filtre of 6 µm porosity, made of polypropylene and that makes it possible to obtain a polycondensation product—known as polymer B—containing 0.5% of insolubles.

Polymer B is characterized by a viscosity at 25° C. of 35 cps, this viscosity being determined for an aqueous solution of polymer B concentrated to 49.6% by weight, a cationic charge density of 6.2 meq·g$^{-1}$, and a chlorides content equal to 8% by weight of the polymer; these values being measured according to the protocols as previously defined here above.

Example 2: Preparation of a Polymer P1 of Diallyl Dimethyl Ammonium Chloride Characterized by a Chlorides Content Cower than 10% by Weight of the Polymer In a 1 litre reactor equipped with a jacket, a condenser, a mechanical agitation mechanism and a temperature sensor probe, the following were added: 95 g of water, 135 g of diallyl dimethyl ammonium chloride (DADMAC) at a concentration of 64% by weight in water (source: SNF©) and 17 g of sodium hypophosphite at a concentration of 50% by weight in water. Solutions of sodium hypophosphite and sodium persulfate were prepared by mixing respectively 13 g of water with 13 g of sodium hypophosphite (source: Sigma Aldrich) and 100 g of water with 13 g of sodium persulphate (source: Sigma Aldrich). 536 g of DADMAC (concentration 64% by weight in water), as well as solutions of sodium hypophosphite and sodium persulfate were gradually added into the 1 litre reactor, over a period of 2 hours.

The homopolymer of DADMAC obtained—known as polymer C—is characterized by a charge density of 6 meq·g$^{-1}$, a viscosity at 25° C. of 52 cps, this viscosity being determined for an aqueous solution of polymer C concentrated to 51% by weight, and a chlorides content of 22% by weight of the polymer; these values being measured according to the protocols as previously defined here above.

Then, 500 g of polymer C were introduced into a thermostatically controlled 1-litre reactor equipped with a jacket, a magnetic agitator, a condenser, and a temperature sensor probe, in which 152 g of potassium acetate was added. The reaction mixture was heated to 85° C., then maintained under agitation for a period of 4 hours before being cooled to 30° C. The resulting mixture obtained was filtered with a centrifugal extractor RC30 (supplier: Robatel) equipped with a filtre of 6 µm porosity, made of polypropylene that makes it possible to obtain a polymer product of DADMAC—known as polymer D—containing 1% of insolubles.

Polymer D is characterized by a viscosity at 25° C. equal to 53 cps, this viscosity being determined for an aqueous solution of polymer D concentrated at 50% by weight, a cationic charge density of 5.4 meq·g$^{-1}$ and a chlorides content equal to 7% by weight of the polymer; these values being measured according to the protocols as previously defined here above.

Example 3: Use of Water-Soluble Cationic Polymers as an Agent for Clay Moderation in a Flow Test Concrete (Slump Test)

The performance of the water-soluble cationic polymers P1 of the present invention is evaluated in the flow of a cementitious composition (according to the standard ASTM C1611).

The "slump test" consists of positioning a cone at the center of a plate, on which is drawn a circle, filling the cone (open at its two bases) with the composition in respect of which are to be measured the flow, the screeding and the demoulding. Concrete thus flows more or less based on its rheology. The spreading is the average of the distances along two axes that are perpendicular between the centre of the circle and the end of the position formed by the poured concrete.

The cementitious formulation is composed of
Cement (source: Lafarge) dosed in proportions of 445 kg/m$^3$
Sand (normalised, with density of 1485 kg/m$^3$) dosed in proportions of 885 kg/m3.
Bentonite clay
Water
Polycarboxylic acid superplasticiser (Floset™ SH7 from the company SNF©)

Several compositions (1 to 4) were prepared by mixing sand, cement, clay, water, a superplasticiser and a water-soluble cationic polymer for a period of 5 minutes. The proportions of the different components are summarised in Table 1, as well as the results of the flow test of the composition.

TABLE 1

Characteristics of four compositions comprising the water-soluble cationic polymers and results of the spreading test of the concrete.

| Composition | 1 | 2 | 3 | 4 |
|---|---|---|---|---|
| Cement (g) | 450 | 450 | 450 | 450 |
| Water (g) | 202.5 | 202.5 | 202.5 | 202.5 |
| Sand (g) | 1350 | 1350 | 1350 | 1350 |
| Clay (g) | 9.45 | 9.45 | 9.45 | 9.45 |
| Superplasticiser (g) | 7.5 | 7.5 | 7.5 | 7.5 |
| Type of Cationic Polymer | — | Polymer B (according to the invention) | Polymer D (according to the invention) | CMA-2 of patent US2015/0065614 (comparative) |
| Cationic Polymer (g) | 0 | 0.189 | 0.199 | 0.189 |
| Spreading of the concrete (mm) | 240 | 310 | 320 | 310 |

Based on the Table 1, the water-soluble cationic polymers make possible a gain of about 30% with respect to the flow of concretes. Cationic polymers with reduced content levels of halides (polymers B and D) and derived from the method of the invention have performance levels that are similar or superior to the cationic polymers of the state of the art as reflected in the document US 2015/0065614.

According to the examples of US 2015/0065614, the polymer CMA-2 is characterized by a cationic charge density of 7.2 meq/g, a chloride content of 25% by weight of the polymer and a viscosity of 8.4 cps, this viscosity being determined for an aqueous polymer solution concentrated to 50% by weight.

Thus, the decrease in the halides content in the cationic water-soluble polymer does not result in the loss of activity of this polymer.

Example 4: Test of the Corrosion Induced by Various Vationic Polymers

The test consists of the immersing of metal cuttings of various different grades/alloys into the solutions of cationic polymers. A qualitative assessment of the corrosion is carried out on the basis of a scale ranging from 0 to 10:
  0=No corrosion observed
  3=Some points of corrosion (pitting-type) were observed
  5=Moderate attack of the entire metal cutting
  7=Severe attack of the entire metal cutting
  10=Complete attack of the entire metal cutting.

The metal cuttings have the following dimensions: length: 100 mm, width: 30 mm, thickness: 1 mm. Before use, the metal cuttings were cleaned in order to remove any solids and were washed with acetone in order to remove any oil residue on their surface. They were then immersed in a vessel containing an aqueous solution of a cationic polymer in a concentration of 50% by weight so as to remain immersed therein for a period of 14 days at 30° C.

The results of this corrosion test conducted on two different steels and in the presence of four different water-soluble cationic polymers (comparative and according to the invention) in solution are presented in Table 2.

TABLE 2

Evaluation of the corrosion induced by various different cationic polymers

| Cationic Polymer | Grade of Steel | % by weight of chlorides in the polymer | Evaluation of the corrosion |
|---|---|---|---|
| Polymer B (comparative) | Carbon Steel | 8 | 4 |
| Polymer D (according to the invention) | Carbon Steel | 7 | 4 |
| CMA-2 (US 2015/0065614) (comparative) | Carbon Steel | 26 | 8 |
| Polymer C (comparative) | Carbon Steel | 22 | 7 |
| Polymer B (according to the invention) | Stainless Steel 304L | 8 | 1 |
| Polymer D (according to the invention) | Stainless Steel 304L | 7 | 1 |
| CMA-2 (US 2015/0065614) (comparative) | Stainless Steel 304L | 26 | 5 |

Table 2 shows that on a carbon steel grade, the water-soluble cationic polymers P1 derived from the method according to the invention (polymers B and D) induced a level of corrosion that was reduced, and in comparison, was two times less than that with the polymers that present a higher halides content (polymers C and CMA-2).

Thus, the use of the polymers P1 according to the invention clearly induces a reduced level of corrosion in comparison to the use of polymers of the state of the art.

The same observations may be made with regard to the use of cationic polymers on a grade of stainless steel 304L.

The invention claimed is:

1. A method for preparing an aqueous solution of water-soluble cationic polymers P1 wherein the halides content is lower than 10% by weight of the polymer, the viscosity at 25° C. is lower than 200 cps, said viscosity being determined for an aqueous solution of polymers P1 concentrated at 50% by weight, and the cationic charge density is greater than or equal to 4 meq·g$^{-1}$, characterized in that it comprises the following successive steps:
  a) adding, at a temperature comprised between 0° C. and 120° C., of at least one compound of formula (I) to an aqueous solution of at least one water soluble cationic polymer P2 wherein the halides content is greater than 10% by weight of the polymer, the viscosity at 25° C. is lower than 200 centipoise cps, said viscosity being determined for an aqueous solution of polymers P2 concentrated to 50% by weight, and the cationic charge density being greater than or equal to 4 meq·g$^{-1}$, the compound of formula (I) being defined by the formula: $R^1$—COO$^-$Y$_1^+$, wherein:
  $R^1$ represents a hydrogen atom or a saturated alkyl chain, either linear or branched, comprising from 1 to 8 carbon atoms, that may contain at least one nitrogen atom and/or oxygen atom, said chain may be substituted by 1 to 4 carboxylate functional groups of formula —COR;
  Y$_1^+$ represents an alkali metal cation, an ammonium ion of formula $R^2$—NH$_3^+$, or a quaternary ammonium of formula $R^3$—N$^+$(R$^4$)(R$^5$)(R$^6$);
  R represents an OH group or a group O$^-$Y$_2^+$;
  Y$_2^+$ represents an alkali metal cation or an ammonium ion of formula $R^2$—NH$_3^+$;
  $R^2$ represents a hydrogen atom or a saturated alkyl chain, either linear or branched, comprising from 1 to 4 carbon atoms; and R³, R⁴, R⁵ and R⁶ represent, independently of each other, a saturated alkyl chain, either linear or branched, comprising from 1 to 4 carbon atoms;

in order to obtain a mixture;

b) agitation of the mixture obtained in step a) for at least 5 minutes in order to obtain a stirred mixture;

c) decreasing of the temperature of the stirred mixture obtained at the end of step b) at a temperature comprised between −10° C. and 50° C. in order to obtain a cooled mixture; and d) liquid/solid separation of the cooled mixture obtained at the end of step c) in order to obtain an aqueous solution of cationic polymers P1.

2. A method according to claim 1, wherein the water-soluble cationic polymers P1 are characterised by a cationic charge density greater than or equal to 5 meq·g⁻¹.

3. A method according to claim 1, in which the water-soluble cationic polymers P1 are characterised by a content by weight of insoluble compounds lower than 2% relative to the total weight of the polymer.

4. A method according to claim 1, in which in step a) the ratio of the number of anionic charges of the compound of formula (I) to the number of cationic charges of the water-soluble cationic polymer P2 is comprised between 0.2:1 and 5:1.

5. A method according to claim 1, in which the water soluble cationic polymer P2 is characterised by a cationic charge density greater than or equal to 6 meq·g⁻¹.

6. A method according to claim 1, in which the compound of formula (I) is selected from among sodium formate, potassium formate, sodium acetate and potassium acetate.

7. A method according to claim 1, in which liquid/solid separation step d) is a decantation or filtration process, preferably a filtration process.

8. A method according to claim 1, in which the water soluble cationic polymer P2 is derived from the polymerisation of at least one monomer of such type as diallyldialkyl ammonium halide.

9. A method according to claim 1, in which the water soluble cationic polymer P2 is derived from the polymerization of at least diallyl dimethyl ammonium chloride.

10. A method according to claim 1, in which the water soluble cationic polymer P2 is a polymer that is derived from the polycondensation of at least one epihalohydrin and at least one secondary amine.

11. A method according to claim 1, in which the water soluble cationic polymer P2 is a polymer that is derived from the polycondensation of epichlorohydrin and dimethylamine.

12. A method according to claim 11, in which the stoichiometric ratio between dimethylamine and epichlorohydrin is comprised between 1:0.99 and 1:0.80.

13. A method according to claim 1, in which the water-soluble cationic polymers P1 are characterized by a cationic charge density that is greater than or equal to 6 meq·g⁻¹.

14. Composition based on inorganic mineral binders or on gypsum derivatives comprising a water soluble cationic polymer P1 obtained by the method according to claim 1 as additives.

15. Method for the treatment of open, semi—closed, or closed aqueous circuits comprising the use of a water soluble cationic polymer P1 obtained by the method according to claim 1.

16. Method for moderating the effect of clays in a composition based on inorganic mineral binders or on gypsum derivatives comprising the use of a water soluble cationic polymer P1 obtained by the method according to claim 13.

* * * * *